United States Patent
Forbes (10) Patent No.: US 6,293,410 B1
(45) Date of Patent: Sep. 25, 2001

(54) NO-CURE FUEL FILTER AND METHOD FOR MAKING SAME

(75) Inventor: Larry D. Forbes, Des Moines, IA (US)

(73) Assignee: Mahle-Parr Filter Systems, Inc., Des Moines, IA (US)

( * ) Notice: Subject to any disclaimer, the term of this patent is extended or adjusted under 35 U.S.C. 154(b) by 0 days.

(21) Appl. No.: 09/342,612

(22) Filed: Jun. 29, 1999

(51) Int. Cl.[7] .................................................. B01D 27/04
(52) U.S. Cl. ........................ 210/446; 210/447; 210/454; 210/455; 210/457; 210/483; 210/488; 210/497.01; 210/500.26
(58) Field of Search ..................................... 210/446, 447, 210/450, 453, 454, 455, 483, 484, 232, 451, 509, 500.26, 323.2, 497.01, 437–438, 448, 488, DIG. 13, DIG. 17, 503, 506, 508

(56) References Cited

U.S. PATENT DOCUMENTS 2,079,910 * 5/1937 Kamrath .
2,692,685 * 10/1954 Garland .

(List continued on next page.)

OTHER PUBLICATIONS

Hawley's Condensed Chemical Dictionary, 13th edition (Lewis, Richard J., Sr., pertinent p. 1097).*
2–Page brochure (color) Entitled Schuller—We Build Environments—Fiber Glass OEM Filter Tubes date at bottom of page is 7–96—by Filtration Division—Schuller International, Inc.
5 pages (copy) copied from a web site. by Johns Manville Engineered Products—Fiber Glass OEM Filter Tubes.
4 pages (copy) copied from a web site by Johns Manville Engineered Products Melamine–Bonded Fiber Glass Filter Cartridges.
5 pages (copy) of a letter—first page entitled Tabco Technologies, Inc.—signed by Tom Barber and Ludmila Kistersky.

Primary Examiner—W. L. Walker
Assistant Examiner—Marianne S. Ocampo
(74) Attorney, Agent, or Firm—Henderson & Sturm LLP (57) ABSTRACT

A no-cure fuel filter and method of making same is disclosed. The no-cure fuel filter utilizes a non-organic, mineral based filter element which replaces the pleated paper type filter element of conventional fuel filters. The no-cure fuel filter may be used for gasoline blended fuels, ethanol blended fuels, diesel fuel blends, propane fuel blends, or methanol fuel blends, and may be used for primary filtration, secondary filtration or final filtration. The no-cure fuel filter comprises a non-organic mineral based filter element disposed along a path of flow of unfiltered fuel in a fuel system of a vehicle. The filter element includes an exterior periphery and an interior periphery and a first end and a second end. The no-cure fuel filter further comprises end caps disposed over and fluidly sealing the first and second ends of the filter element, such that the unfiltered fuel must pass through the filter element from one of the peripheries to the other periphery.

5 Claims, 5 Drawing Sheets

OTHER PUBLICATIONS

| | | | |
|---|---|---|---|
| 3,002,870 | * | 10/1961 | Belgarde et al. . |
| 3,122,501 | * | 2/1964 | Hultgren . |
| 3,142,612 | * | 7/1964 | Reiman . |
| 3,317,043 | * | 5/1967 | Vanderpoel . |
| 3,361,261 | * | 1/1968 | Fairey et al. . |
| 3,442,391 | * | 5/1969 | Bozek . |
| 3,972,694 | * | 8/1976 | Head . |
| 4,062,781 | * | 12/1977 | Strauss et al. ............ 210/446 |
| 4,210,540 | * | 7/1980 | Perrotta ..................... 210/497 |
| 4,228,011 | * | 10/1980 | Cote, Jr. ..................... 210/232 |
| 4,588,500 | | 5/1986 | Sprenger . |
| 5,076,920 | | 12/1991 | Danowski et al. . |
| 5,085,773 | * | 2/1992 | Danowski ..................... 210/446 |
| 5,089,132 | * | 2/1992 | Sussich et al. ............... 210/298 |
| 5,164,084 | | 11/1992 | Danowski et al. . |
| 5,164,879 | | 11/1992 | Danowski et al. . |
| 5,306,424 | * | 4/1994 | Matsushita ..................... 210/448 |
| 5,380,432 | | 1/1995 | Brandt . |
| 5,382,359 | | 1/1995 | Brandt . |
| 5,413,711 | * | 5/1995 | Janik ..................... 210/300 |
| 5,456,983 | | 10/1995 | Sassa . |
| 5,603,829 | * | 2/1997 | Baumann ..................... 210/275 |
| 5,667,611 | | 9/1997 | Sassa . |
| 5,698,059 | * | 12/1997 | Bilski et al. . |
| 5,785,725 | | 7/1998 | Cusick . |
| 5,800,586 | | 9/1998 | Cusick . |
| 5,800,702 | * | 9/1998 | Taylor-McCune et al. ......... 210/162 |
| 5,830,348 | * | 11/1998 | Vannoy et al. ............... 210/109 |
| 5,840,245 | | 11/1998 | Coombs . |
| 5,846,603 | | 12/1998 | Miller . |
| 5,919,362 | * | 7/1999 | Barnes et al. ............ 210/232 |

\* cited by examiner

Fig. 6

NO-CURE FUEL FILTER AND METHOD FOR MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to fuel filters and methods for making same, and more particularly to such fuel filters not requiring curing processes in their manufacture.

2. Description of the Related Art

Most fuel filters include a non-removable cylindrical shaped filter element comprised of an elongated pleated paper filter media having an annular cap at each end. The present method of manufacturing fuel filters containing these pleated paper filter elements is not only time consuming, but presents a number of environmental concerns, health related issues, and unpleasant working conditions due to the release of formaldehyde and hydrocarbons into the manufacturing plant and atmosphere in general from the cure of the filter paper and adhesives required to manufacture the filter elements. Additionally, these adhesives contain chemicals with which manufacturing personal may come in contact with during the manufacturing process.

The following description illustrates the problems associated with the present method of manufacturing pleated paper filter elements. The paper filter media used in such fuel filters is usually supplied to the fuel filter manufacturer from an outside vendor who fabricates the paper filter media in compliance with the filter manufacturer's specifications and delivers it in large 36 inch diameter rolls of varying widths. These large filter paper rolls are then loaded onto a pleating machine which is set to the desired pleat height and width to satisfy the specifications for the filter element. After the filter paper is threaded into the pleating machine and pleated, the pleated filter paper travels down a heated line to a cutting machine which may be automated or manual. The pleats are counted and the paper is cut to the correct number of pleats required for the filter element being manufactured. The cut filter media then moves to the welding operation and is rolled and welded into a cylindrical shape having an unfinished length. These cylinder shaped lengths of pleated filter paper are then cut to a finished length or "broken" to a finished length if the filter paper is purchased in "slit" widths. Next, one end of each finished length of the cylinder shaped pleated filters, referred to hereinafter as the paper element, is placed into an annular adhesive filled end cap. A non-adhesive-filled annular end cap is placed on the other end of the paper element to hold the shape of the unfinished filter element. This assembly is then placed in a first bake oven. When the adhesive is cured, the assembly exits the first bake oven. The non-adhesive filled end cap is removed and the assembly is turned over and placed into another annular adhesive filled end cap. This final assembly is then placed into the final bake oven to cure the adhesive in the second end cap and to cure the paper element, resulting in a finished filter element. The finished filter element is then placed into a filter element housing. A filter housing end cap is then press fit and seal welded to the filter element housing resulting in a completed fuel filter.

As should be evident from the above description, there is a considerable amount of wasted or down time in the present method of manufacturing fuel filters containing the conventional pleated paper elements. First, as discussed above, the present method requires the baking of the filters to cure the adhesives. Depending on the ovens being used, it may take 20 to 40 minutes for the filter elements to pass through each oven. Second, more time is wasted while the baking ovens are warming-up to the necessary temperature for the curing process. Third, at breaks and at the ends of shifts, the oven cannot be loaded for the last 20 to 40 minutes in order to ensure that all the filters are cleared from the ovens.

Thus, there is a need in the fuel filter manufacturing industry for a "no-cure" fuel filter element. By eliminating the necessity to cure the adhesives, there is no need for ovens which will save the manufacturer in equipment costs, maintenance and energy consumption. Additionally, with no-cure fuel filter elements, more filters can be produced per hour with less personal, because numerous steps in the manufacturing process can be eliminated and because with the no-cure process, filters can be manufactured from the start of the shift, right up to breaks and right to the end of the shift, rather than having to wait for the ovens to warm up, wait for the filters to pass through the ovens, and having to stop loading the ovens 20 to 40 minutes before the end of the shift.

Additionally, by eliminating adhesives and the oven curing processes, the worker's environment and the environment in general will be improved due to the elimination of the unpleasant odors caused by the release of formaldehyde into the atmosphere by the paper filter media during the curing process, due to the elimination of the release of hydrocarbons into the atmosphere during the curing of the adhesive, and due to the elimination of potential contact of the workers with the chemicals found in the adhesives.

Those concerned with these and other problems recognize the need for an improved no-cure fuel filter and method of making the same

BRIEF SUMMARY OF THE INVENTION

No-cure fuel filters and method of making same for primary, secondary and final filtration fuel filters. The no-cure fuel filters utilize a non-organic, mineral based filter element which replaces the pleated paper type filter element of conventional fuel filters. The no-cure fuel filter may be used for gasoline blended fuels, ethanol blended fuels, diesel fuel blends, propane fuel blends, or methanol fuel blends. The no-cure fuel filter comprises a non-organic mineral based filter element disposed along a path of flow of unfiltered fuel in a fuel system of a vehicle. The filter element includes an exterior periphery and an interior periphery and a first end and a second end. The no-cure fuel filter further comprises end caps disposed over and fluidly sealing the first and second ends of the filter element, such that the unfiltered fuel must pass through the filter element from one of the peripheries to the other periphery.

These and other attributes of the invention will become more clear upon a thorough study of the following detailed description of the invention, particularly when reviewed in conjunction with the drawings.

DETAILED DESCRIPTION OF THE INVENTION

Figure 1:
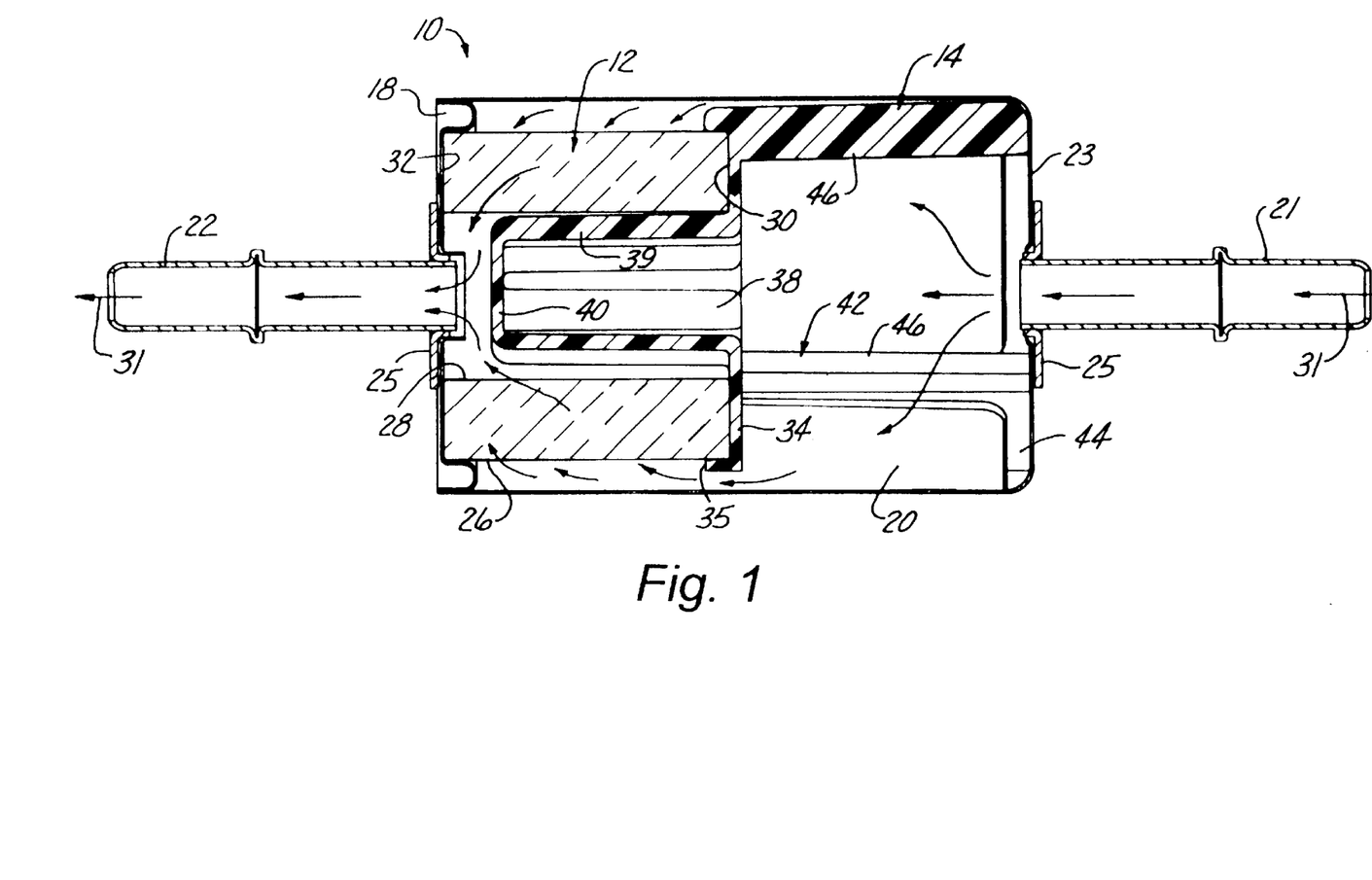
FIG. 1 is a cross-sectional view of a preferred embodiment of a final filtration type, no-cure fuel filter of the present invention.

Referring now to the drawings, wherein like reference numerals designate identical or corresponding parts throughout the several views, for purposes of illustration, FIG. 1 shows a preferred final filtration type fuel filter (10) manufactured in accordance with the no-cure method of the present invention.

The preferred final filtration type fuel filter (10) is comprised of a non-organic mineral based filter element (12), a filter support (14), a casing (16) and a base cap (18). The casing (16) is defines a chamber (20) in fuel communication with an inlet port or inlet stem (21) and outlet port or outlet stem (22). The inlet stem (21) is fluidly sealed and secured to the end (23) of the casing (16) by a stem support washer (25). The outlet stem (22) is fluidly sealed and secured to the base cap (18) by a stem support washer (25). The base cap (18) is fluidly sealed and secured to the casing (16) such that fuel can only enter and exit the chamber (20) through the inlet and outlet ports (21, 22).

Figures 2, 2A:
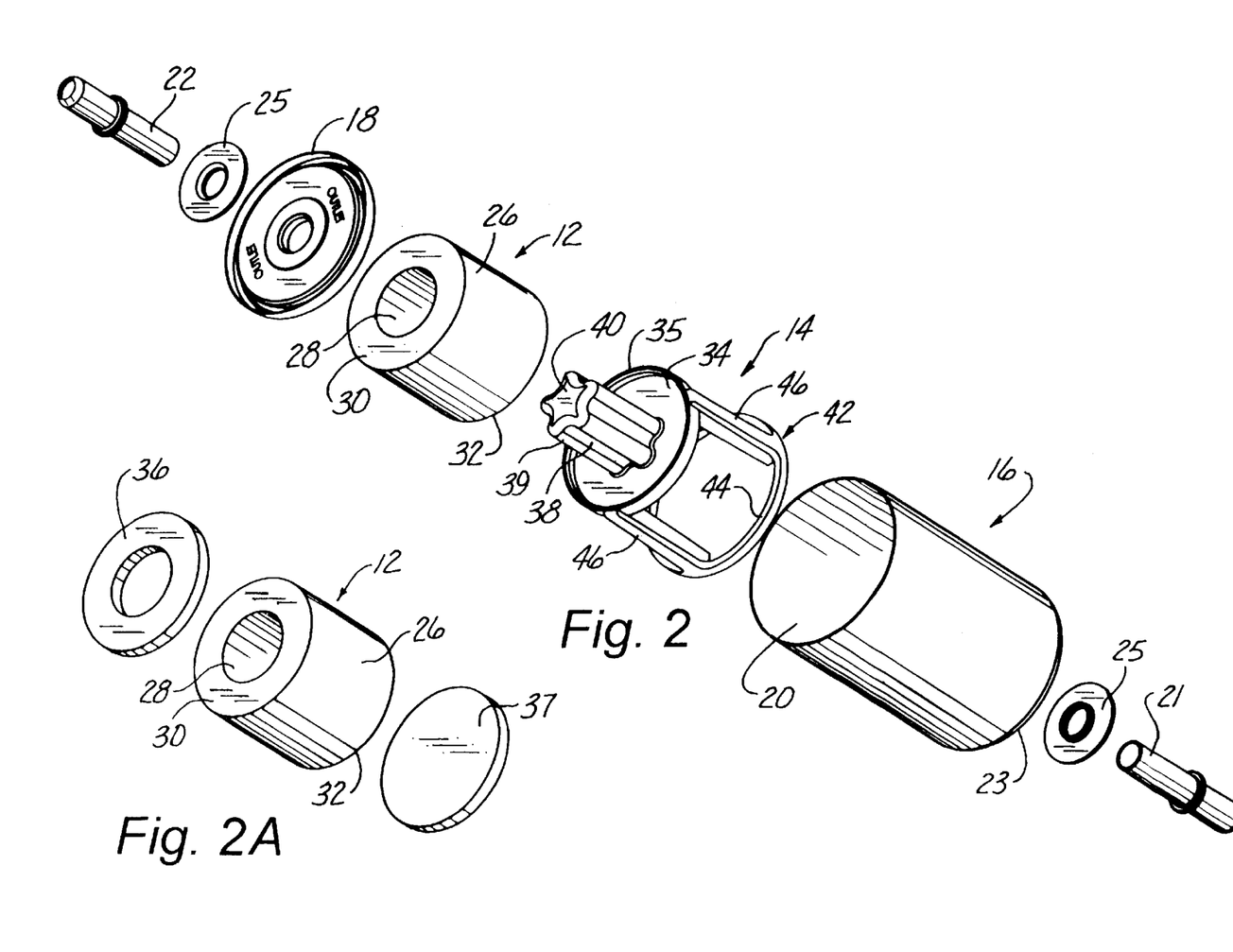
FIG. 2 is an exploded perspective view of the final fuel filter of FIG. 1.
FIG. 2A is an exploded perspective view of the fuel filter of FIG. 1 showing the alternate end cap configuration for the no-cure fuel filter element.

Referring also to FIG. 2, which is an exploded perspective view of the final filtration type fuel filter (10), the non-organic mineral based filter element (12) is preferably tubular in shape thereby defining an outer periphery (26) and an inner periphery (28) and a first end (30) and a second end (32). The filter element (12) is fabricated from a non-organic mineral based filter media, for example fiberglass, basalt, etc.

For the preferred fiberglass filter media, fiber diameters are preferably within the range of 0.00015 to 0.00040 inches, densities are preferably within the ranges of 4 to 10 pounds per cubic foot (pcf), and binder content is preferably within the range of 10%±3% by weight to 18%±3% by weight. Also interleafing may be used to both increase filtration efficiency and to adjust porosity gradients through the filter media to meet specific application requirements. A fiberglass filter media having these properties will achieve filter efficiencies between the ranges of 95% to 100% at ranges between 5 to 40 microns. For example, to achieve a 98% filtering efficiency at 8 microns it has been determined that for the preferred embodiment of the final fuel filter of FIGS. 1–2, the preferred fiberglass filter element (12) preferably has the following properties: a nominal fiber diameter between 0.00020 and 0.00024 inches, having a density of 5.8 pounds per cubic foot (pcf) and a phenolic binder content of 10%±3% by weight with a single spiral interleaf having the following properties: AA fibers between 0.75 and 1 microns, a density of 5.3 gm/sf, a phenolic binder content of 13.5%, a thickness of 0.25 inches.

It should be understood that specific reference to the nominal fiber diameter, densities, binder content, and the use of interleafing material for the filter media is included in this specification only for the purpose of providing an enabling disclosure and for disclosing the inventor's best mode for practicing the invention at the time the application was filed. Different filters may have different fiber diameters, densities, and binder content and may or may not require interleafing depending on the type of non-organic filter media being used, the desired inside and outside diameters for the filter element, the desired filtering efficiencies, etc. Thus, the scope of the present invention should not be considered limited to the above identified preferred filter media and properties.

The filter support (14) includes a filter end cap (34) (FIG. 2) having an outside diameter less than the inside diameter of the casing (16) (see FIG. 1), such that fuel can flow between the walls of the case (16) and the outside of the end cap (34) as indicated by arrows (33) (FIG. 1) showing the direction of travel of the fuel through the filter (10). The end cap (34) receives the first end (30) of the filter element (12) and preferably includes a lip (35) which holds the filter element (12) to the end cap (34). Extending upward from the end cap (34) is preferably a star-shaped stem (38) closed at its upper end (40) to prevent fuel flow therethrough, and having an overall outside diameter slightly less than the inside diameter of the tubular shaped filter element (12). The star shape of the stem (38) allows the points (39) of the star to abut the interior periphery (28) of the filter element (12) to prevent it from buckling or collapsing under fuel pressure when saturated with contaminates or impurities, such that fuel is allowed to flow toward the outlet port (22) between the points (39) of the star. Obviously any irregular shaped stem could be used to perform the same function as the preferred star shaped stem (38), and therefore any modification of the shape of the stem (38) should be considered within the scope of this invention. Furthermore, a stem may not even be necessary, and is disclosed here only as a preferred embodiment. Thus, although the preferred embodiment of the filter support (14) includes a stem (38), a filter support without a stem should also be considered within the scope of this invention.

Because the non-organic, mineral based filter media of the filter element (12) of the present invention has greater filtering efficiency and greater dirt capacity than conventional pleated paper fuel filters, the length of the filter element (12) need not be as long as the conventional pleated paper filter element to accomplish the same fuel filtering requirements. Therefore, in order to reduce the cost of the fuel filter (10) of the present invention, the length of the non-organic, mineral based filter element (12), may be reduced to about half the length of the pleated paper filter element that it is intended to replace. Additionally, so that the same casing (16) as used for the pleated paper filter element can be used for the shorter non-organic, mineral based filter element (12), a spacer stand (42), which may or may not be integrally formed with the end cap (34), supports the filter element (12) within the casing (16).

In the preferred embodiment, the spacer stand (42) is integrally formed with the end cap (34), and is made of plastic material such as nylon-six so that the stand and end cap will not degrade when exposed to various types of fuels. The material comprising the spacer stand (42) may also include a percentage of fiberglass, for example 10% by weight, for added stiffness or rigidity. Obviously, any other material that will not degrade is also suitable for the spacer stand (42). The preferred spacer stand (42) includes a base ring (44) and three equally spaced legs (46) thereby forming a stable and somewhat rigid support structure that will substantially resist longitudinal deflection for the reason discussed below. The preferred embodiment of the filter support (14) thereby allows the fuel to flow into the chamber (20), around the legs (44), and past the end cap (34) as shown in FIG. 1 by arrows (33). The combined length of the filter support (14) and filter element (12) is preferably slightly longer than the length of the chamber (20) such that when pressing the base cap (18) onto the casing (16), the filter element (12) is slightly compressed thereby fluidly sealing the first and second ends (30, 32) of the filter element (12) between the filter support end cap (34) and the casing base cap (18) as shown in FIG. 1 such that all of the fuel entering the chamber (20) through the inlet port (21) must pass through the filter element (12) from the exterior periphery (26) to the interior periphery (28) before exiting the chamber (20) through the outlet port (22). It should therefore be appreciated that if the spacer stand (42) is not able to substantially resist longitudinal deflection, the filter element (12) may not be sufficiently compressed to seal the ends (30, 32) of the filter element (12) against the end cap (34) and the base cap (24) thereby allowing unfiltered fuel to pass through the final fuel filter (10) without being filtered. It should also be appreciated that any structure able to support the end cap (34) within the chamber (20) while at the same time permitting fuel to freely flow into the chamber (20) and past the end cap (34) while at the same time substantially resisting longitudinal deflection in order to properly seal the first and second filter ends (30, 32) should be considered within the scope of this invention even though the structure performing these functions differ substantially from the preferred structure. For example, such structures which may perform the functions stated may include a spring, a perforated cylinder, etc.

It should also be appreciated that in those designs of fuel filters where room for a spacer stand (42) is not available within the casing (16), or where a particular design does not allow for the filter element (12) to be compressed in order to seal the ends (30, 32) of the filter element (12), washer type end caps (36, 37) (FIG. 2A) may be adhered to the ends (30, 32) of the filter element (12) such as by an adhesive or hot plate sealing. By adhering washer type end caps (36, 37) to the ends (30, 32) of the filter element (12), the filter element may become rigid enough such that a stem (38) is not required to keep the filter element from collapsing or buckling under fuel pressure when saturated with contaminates or impurities.

Obviously, many configurations of fuel filters (10) are used in the industry with each configuration having a specific purpose. Accordingly, rather than attempting to disclose each and every possible configuration for fuel filters in which a no-cure fuel filter and method of making same may be used, it should be understood that the present invention can be used in any type of fuel filter in which a pleated paper type filter is currently being used, whether it be for gasoline blended fuels, ethanol blended fuels, diesel fuel blends, propane fuel blends, or methanol fuel blends, and regardless of whether the filter is it to be used for primary filtration, secondary filtration or final filtration. Examples of but a few of these configurations are illustrated in FIGS. 3–9.

Figure 3:
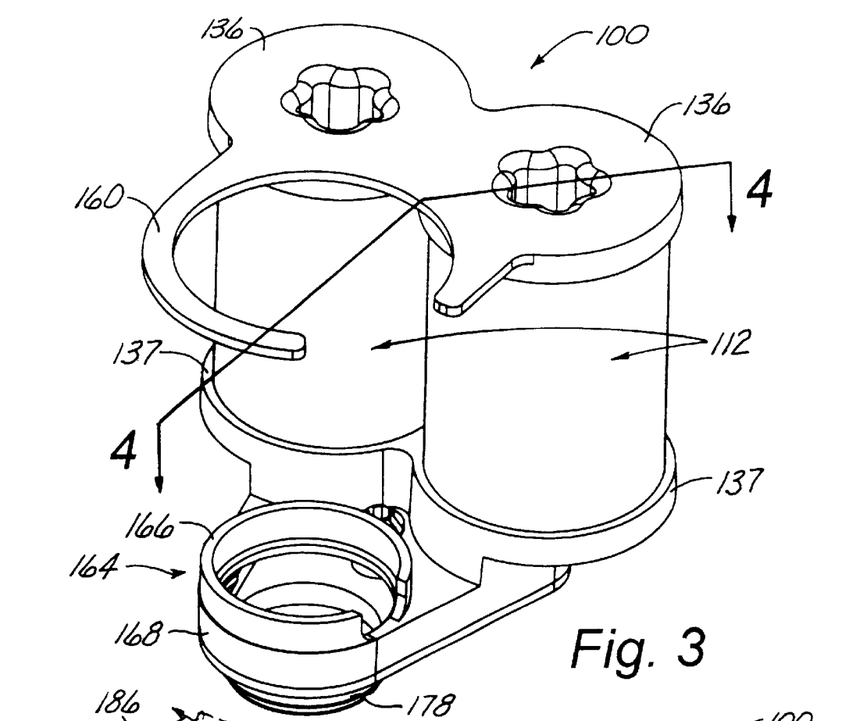
FIG. 3 is perspective view of a secondary filtration type, no-cure fuel filter of the present invention.

FIGS. 3–6 illustrate a secondary filtration type fuel filter (100) of the present invention utilizing the no-cure fuel filter element of the present invention. It should be understood that the structural components comprising a secondary filtration type fuel filter will vary depending on the particular vehicle in which it is used. Accordingly, the embodiment of FIG. 3 is for illustration purposes only and the identification of any particular structural components should not be considered as limiting the scope of the present invention.

Figure 4:
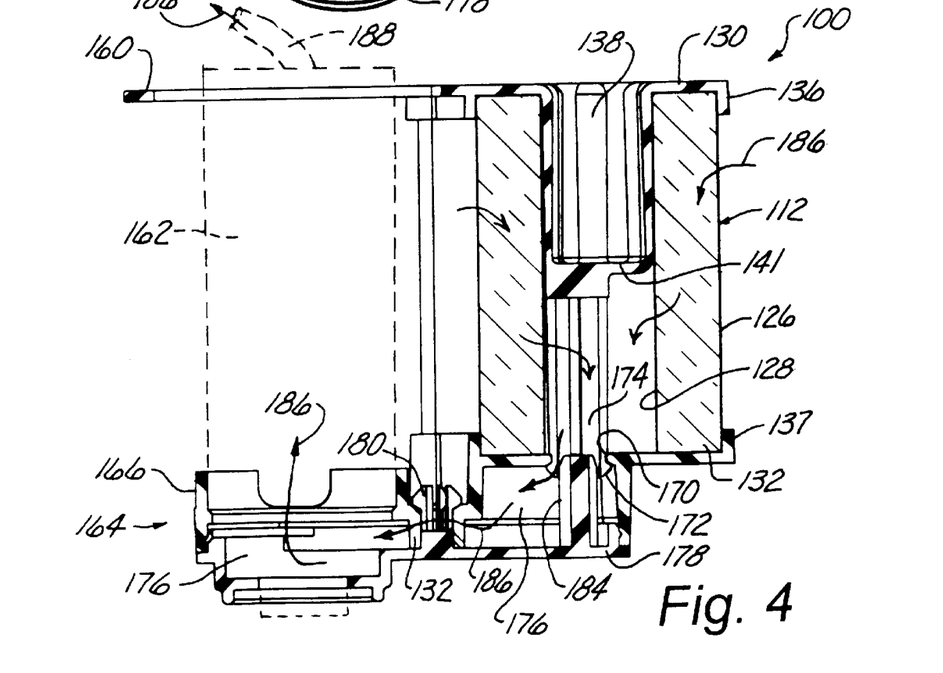
FIG. 4 is a cross-sectional view of the secondary fuel filter as viewed along lines 4—4 of FIG. 3.
Figure 5:
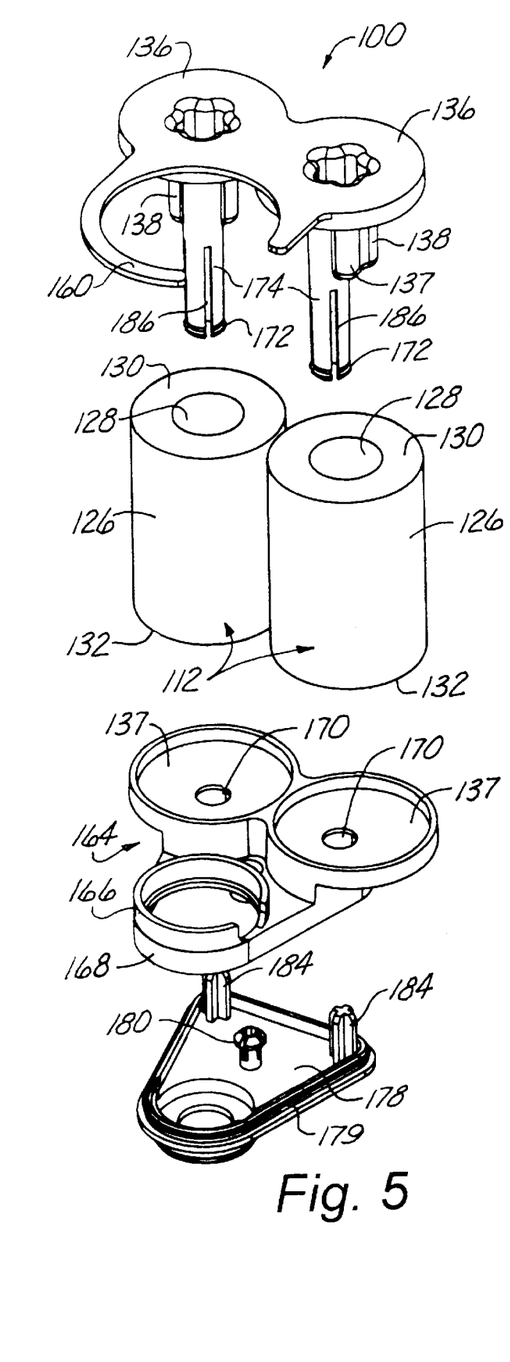
FIG. 5 is an exploded perspective view of the secondary fuel filter of FIG. 3.
Figure 6:
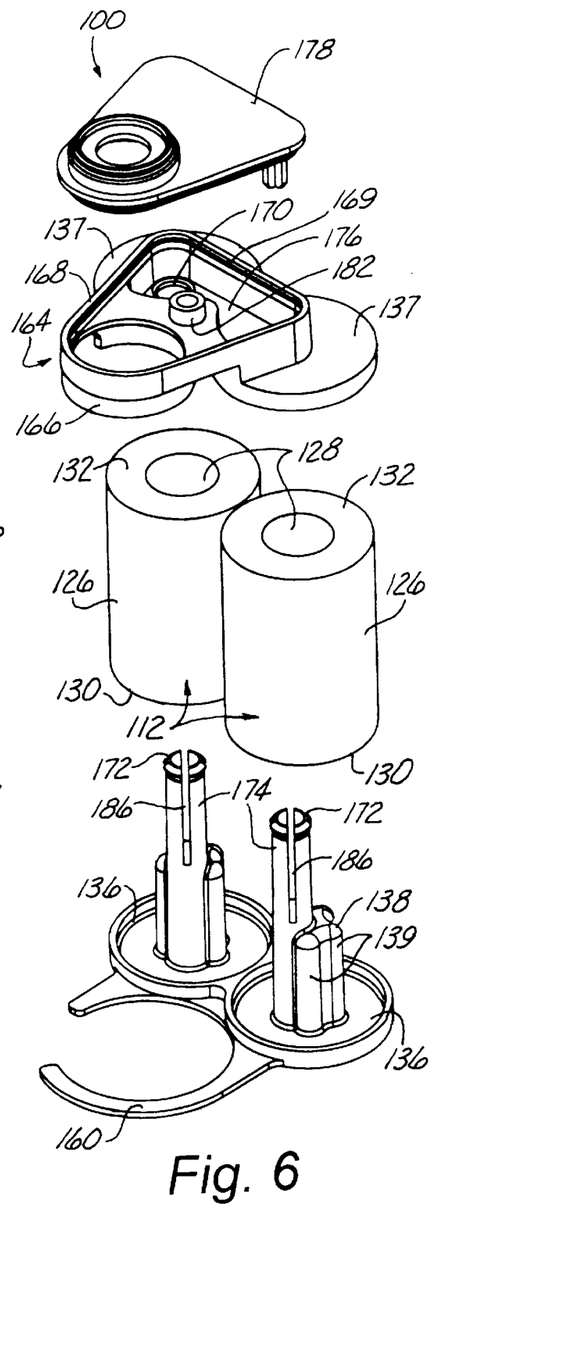
FIG. 6 is an exploded perspective view of the secondary fuel filter of FIG. 3 rotated 180 degrees.

The preferred secondary filtration type fuel filter (100) of FIG. 3 comprises part of the fuel module (not shown) which is disposed within the fuel tank (not shown) of the vehicle. FIG. 4 is a cross-sectional view of the secondary fuel filter (100) as viewed along lines 4–4 of FIG. 3. FIG. 5 is an exploded perspective view of the secondary fuel filter (100) of FIG. 3. FIG. 6 is an exploded perspective view of the secondary fuel filter (100) of FIG. 3 rotated 180 degrees.

Similar to the final filtration fuel filter (10), the secondary filtration filter (100) includes at least one non-organic, mineral based filter element (112), such as fiberglass, basalt, etc., preferably tubular in shape thereby defining an outer periphery (126) (FIGS. 4, 5, 6) and an inner periphery (128) and a first end (130) and a second end (132). Again, the preferred filter element (112) is fabricated from fiberglass. For the preferred fiberglass filter media for the final fuel filter (100), acceptable densities are between the ranges of 4 to 10 pcf with filter efficiencies of 95% to 100% at ranges between 5 to 40 microns. Typically, secondary fuel filters for automobiles have an efficiency of 98% at 35 microns. Again, however, the nominal fiber diameter, densities, binder content, and the use of interleafing, will vary depending on the type of non-organic filter media being used, the desired inside and outside diameters for the filter element, the desired filtering efficiencies, etc.

In the preferred embodiment, the ends (130, 132) of the fuel filter elements (112) are received by end caps (136, 137). The upper end caps (136) are preferably integrally formed with a pump hook (160) which secures the upper end of the fuel pump (162) (FIG. 4) of the fuel module. The secondary fuel filter (100) further comprises a pump adapter (164) which includes lower end caps (137) a pump adapter ring (166), which receives the lower end of the fuel pump (162) (FIG. 4), and a flange (168) having an annular ring (169) about its interior periphery. The lower end caps (137) include an aperture (170) therethrough (FIGS. 5, 6) which receive an upper end (172) of an elongated snap connector (174) preferably integrally formed as part of the stem (138) which is preferably integrally formed in the underside of the upper end caps (136) (best viewed in FIG. 6). The flange (168) of the pump adapter (164) extends around the apertures (170) and the pump ring (164) thereby defining a chamber (176) (FIGS. 4, 6) for fuel flow therein. A pump adapter cap (178) having an annular sealing ring (179) is received by the flange (168) and is secured onto the pump adapter (164) by a snap connector (180) (FIG. 5) received by a locking ring (182) (FIG. 6) at the base of the pump adapter (164).

Referring now to FIGS. 4, 5, and 6 concurrently, when assembling the secondary fuel filter (100), the elongated snap connectors (174) extend through the interior periphery (128) of the filter elements (112), and through the apertures (170) in the lower end caps (137) where they lock in place as best viewed in FIG. 4. As best viewed in FIG. 4, a pair of tabs (184) (see also FIG. 5) also project upward from the pump adapter cap (178) and are received into the upper ends (172) of the elongated snap connectors (174) projecting through the apertures (170) in the lower end caps (137). The tabs (184) tend to spread the upper ends (172) of the elongated snap connectors (174) having slots (186) (FIGS.

5, 6) therein to lockingly secure the snap connectors (174) within the apertures (170). These locking snap connections, together with the annular sealing ring (179) disposed about the outer periphery of the pump adapter cap (178) and received within the annular ring (169) fluidly seal the pump adapter cap (178) to the pump adapter (164).

It should be understood that length of the filter elements (112) are slightly longer than the length between the assembled end caps (136, 137) such that when making the snap connections (170–172, 180–182), the filter elements (112) are slightly compressed thereby fluidly sealing the first and second ends (130, 132) of the filter element (112) between the first and second end caps (136, 137) as shown in FIG. 4.

In operation, the fuel pump (162) draws the fuel from the tank (not shown) toward the fuel filter elements (112). As the fuel passes through exterior periphery (126) to the interior periphery (128) of the filter elements (112) as indicated by arrows (186) (FIG. 4) the fuel is filtered. The filtered fuel is then drawn into the chamber (176) (FIG. 4) through the apertures (170) in the end caps (137) where it is then drawn out of the secondary fuel filter (100) into the fuel pump where it is then pumped into the fuel line (188) (FIG. 4) of the vehicle.

It should be understood that similar to the final fuel filter (10), the secondary fuel filter (100) preferably includes a stem (138) which is preferably integrally formed in the upper end caps (136) and preferably extends at least a distance into the interior periphery (128) of the filter element (112) as shown in FIG. 4. The overall outside diameter of the stem (138) is preferably slightly less than the inside diameter of the tubular shaped filter element (112) and is preferably star-shaped and closed at the end (141) (FIG. 4) to prevent fuel flow therethrough. The star shape of the stem (138) allows the points (139) of the star to abut the interior periphery (128) (see FIG. 4) of the filter element (112) to prevent it from buckling or collapsing under fuel pressure when saturated with contaminates or impurities such that fuel is allowed to continue to flow toward the chamber (176) (FIG. 4). As mentioned above, any irregular shaped stem could be used to perform the same function as the preferred star shaped stem (138), and therefore any modification of the shape of the stem (138) should be considered within the scope of this invention. Furthermore, a stem may not even be necessary, and is disclosed here only as a preferred embodiment. Thus, although the preferred embodiment includes a stem (138), a filter support without a stem should also be considered within the scope of this invention. For example, as previously described for the final filtration fuel filter (10), instead of utilizing a stem to prevent the filter element (112) from collapsing or buckling under fuel pressure when saturated with contaminates or impurities, or when the design of the fuel filter (100) does not allow the filter element (112) to be compressed in order to seal the ends (130, 132), washer type end caps may be adhered to the ends (130, 132) of the filter element (112) such as by gluing or hot plate sealing as shown in FIG. 2A. By adhering washer type end caps to the ends (130, 132) of the filter element (112), the filter element may become rigid enough such that a stem (138) is not required to keep the filter element from collapsing or buckling under fuel pressure when saturated with contaminates or impurities.

Figures 7, 8, 9:
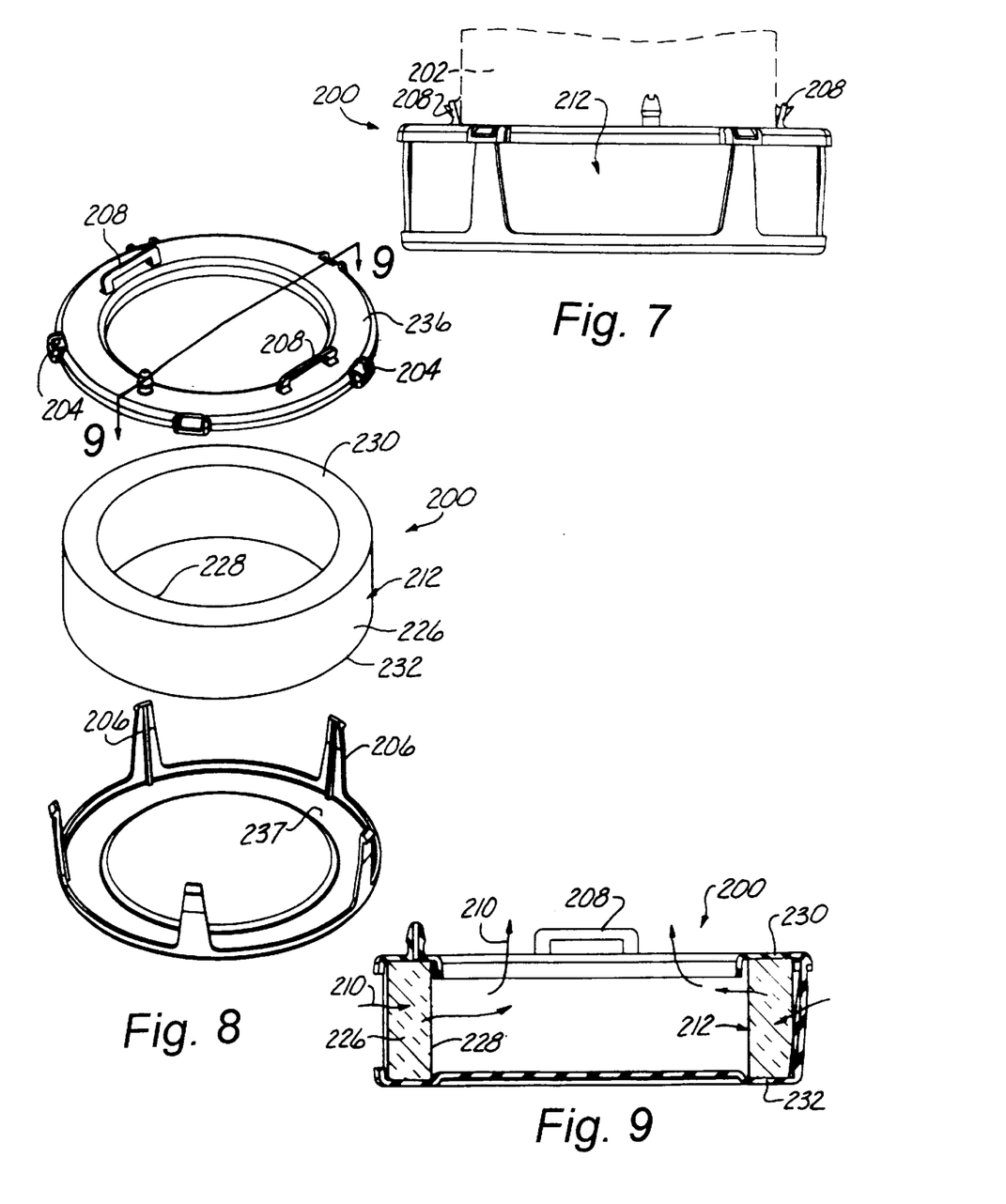
FIG. 7 is a side elevation view of a primary filtration type, no-cure fuel filter of the present invention.
FIG. 8 is an exploded perspective view of the primary fuel filter of FIG. 7.
FIG. 9 is a cross-sectional view of the primary fuel filter as viewed along lines 9—9 of FIG. 8.

In yet another embodiment of the present invention, FIGS. 7–9 illustrate a primary filtration fuel filter (200). It should be understood that the structural components comprising a primary filtration type fuel filter will vary depending on the particular vehicle in which it is used. Accordingly, the embodiment of FIGS. 7–9 are for illustration purposes only and the identification of any particular structural components should not be considered as limiting the scope of the present invention.

The preferred primary filtration type fuel filter (200) comprises part of the fuel module (202) that is fluidly sealed and secured to the top of the primary fuel filer (200). The entire fuel module is disposed within the fuel tank (not shown) of the vehicle. FIG. 8 is an exploded perspective view of the primary fuel filter (200) of FIG. 7, and FIG. 9 is a cross-sectional view of the primary fuel filter (200) as viewed along lines 9—9 of FIG. 8.

Similar to the final filtration and secondary filtration fuel filters (10, 100), the primary filtration fuel filter (200) includes a non-organic, mineral based filter element (212) preferably tubular in shape thereby defining an outer periphery (226) (FIGS. 8, 9) and an inner periphery (228) and a first end (230) and a second end (232). Again, the preferred filter element (212) is fabricated from a non-organic mineral based filter media, for example fiberglass, basalt, etc. For the preferred fiberglass filter media for the primary fuel filter (200), acceptable densities are between the ranges of 4 to 10 pcf with filter efficiencies of 95% to 100% at ranges between 5 to 40 microns. Typically, for automobiles, primary fuel filters have an efficiency of 98% at 35 microns. Again, however, the nominal fiber diameter, densities, binder content, and the use of interleafing, will vary depending on the type of non-organic filter media being used, the desired inside and outside diameters for the filter element, the desired filtering efficiencies, etc.

In assembling the preferred embodiment, of the primary fuel filter (200), the ends (230, 232) of the fuel filter element (212) are received by the end caps (236, 237). The upper end cap (236) preferably includes a plurality of snap clips or locking clips (204) disposed about its outer periphery. The lower end cap (237) preferably includes a plurality of locking tabs (206). The locking tabs (206) are received by the locking clips (204) thereby creating a secured snap connection of the upper and lower end caps (236, 237) with the filter element (212) sandwiched therebetween as best illustrated in FIG. 9. Just as in the preferred embodiments for the final and secondary fuel filters (10, 100), the length of the fuel filter element (212) is slightly longer than the distance between the assembled top and bottom end caps (236, 237) such that the fuel filter element (212) is slightly compressed thereby fluidly sealing the first and second ends (230, 232) of the filter element (212) as shown in FIG. 9. In alternate embodiments, the end caps (236, 237) could be secured to the upper and lower ends (230, 232) respectively by an adhesive or by heat plate sealing as shown in FIG. 2A.

In operation, the fuel pump, disposed within the fuel module (202) secured to the top of the primary fuel filter (200) by tabs (208), draws the fuel toward the fuel filter (200). With the ends (230, 232) sealed, the fuel is forced to pass through the fuel filter element (212) from the exterior periphery (226) to the interior periphery (228) of the fuel filter element (212). The fuel is thus filtered as it is drawn from the exterior periphery (226) to the interior periphery (228) of the filter elements (112) as indicated by arrows (210) (FIG. 9). The filtered fuel is then drawn into the fuel pump where it is then pumped into the fuel line of the vehicle (not shown).

It should be understood that although it was described that for the preferred embodiments for each of the primary, secondary and final fuel filters (10, 100, 200), that the fuel is filtered as it passes through the filter element (12, 112, 212) from the exterior periphery to the interior periphery, there may be applications of the present invention where the fuel is filtered as it passes from the interior periphery to the exterior periphery of the filter element. All such fuel filters utilizing the no-cure fuel filter element of the present invention, regardless of the direction of flow of the fuel through the filter, should be considered within the scope of this invention.

Therefore it should be appreciated that fuel filters utilizing no-cure fuel filter elements in accordance with the above identified novel teachings may be used in any type of fuel filter in which a pleated paper type filter is currently being used, whether it be for gasoline blended fuels, ethanol blended fuels, diesel fuel blends, propane fuel blends, or methanol fuel blends, and regardless of whether the filter is it to be used for primary filtration, secondary filtration or final filtration. And thus, the fuel filters of the present invention eliminates the necessity to cure the adhesives used in conventional pleated paper filters, thereby eliminating the need for ovens which will save the manufacturer in equipment costs, maintenance and energy consumption. Additionally, with no-cure fuel filter elements, more filters can be produced per hour with less personal, because numerous steps in the manufacturing process can be eliminated and because with the no-cure process, filters can be manufactured from the start of the shift, right up to breaks and right to the end of the shift, rather than having to wait for the ovens to warm up, wait for the filters to pass through the ovens, and having to stop loading the ovens 20 to 40 minutes before the end of the shift.

Additionally, by eliminating adhesives and the oven curing processes, the worker's environment and the environment in general will be improved due to the elimination of the unpleasant odors caused by the release of formaldehyde into the atmosphere by the paper filter media during the curing process, due to the elimination of the release of hydrocarbons into the atmosphere during the curing of the adhesive, and due to the elimination of potential contact of the workers with the chemicals found in the adhesives.

As such, although only exemplary embodiments of fuel filters utilizing the no-cure fuel filter elements have been shown and described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A no-cure fuel filter for vehicles, comprising:
   a non-organic mineral based secondary fuel filter element disposed within a path of flow of unfiltered fuel in a fuel system of a vehicle, said filter element having an exterior periphery and an interior periphery and a first end and a second end, said filter element being fiberglass bonded with a thermoset adhesive binder;
   end caps disposed over and fluidly sealing said first and second ends of said filter element, such that said unfiltered fuel must pass through said filter element from one of said peripheries to said other periphery;
   wherein said end caps are secured together in fixed relation by a snap connection with said filter element compressed therebetween; and
   wherein said snap connection is comprised of an elongated snap connector extending from one of said end caps through said interior periphery of said filter element and through an aperture in another one of said end caps.

2. A no-cure fuel filter for vehicles, comprising:
   a non-organic mineral based primary fuel filter element disposed within a path of flow of unfiltered fuel in a fuel system of a vehicle, said filter element having an exterior periphery and an interior periphery and a first end and a second end, said filter element being fiberglass bonded with a thermoset adhesive binder;
   end caps disposed over and fluidly sealing said first and second ends of said filter element, such that said unfiltered fuel must pass through said filter element from one of said peripheries to said other periphery;
   wherein said end caps are secured together in fixed relation by a snap connection with said filter element compressed therebetween; and
   wherein said snap connection is comprised of a plurality of locking tabs extending from one of said end caps along said outside periphery of said filter element and into a plurality of mating locking clips disposed on an outer periphery of another one of said end caps.

3. A method for manufacturing a no-cure fuel filter for vehicles, comprising:
   providing a non-organic mineral based filter element of fiberglass bonded with a thermoset adhesive binder disposed within a path of flow of unfiltered fuel in a fuel system of a vehicle, said filter element having an exterior periphery and an interior periphery and a first end and a second end;
   placing end caps onto said first and second ends of said filter element to fluidly seal said ends, such that said unfiltered fuel must pass through said filter element from one of said peripheries to said other periphery;
   securing said end caps together in fixed relation by a snap connection with said filter element compressed therebetween; and
   wherein said snap connection is comprised of an elongated snap connector extending from one of said end caps through said interior periphery of said filter element and through an aperture in another one of said end caps.

4. A method for manufacturing a no-cure fuel filter for vehicles, comprising:
   providing a non-organic mineral based filter element of fiberglass bonded with a thermoset adhesive binder disposed within a path of flow of unfiltered fuel in a fuel system of a vehicle, said filter element having an exterior periphery and an interior periphery and a first end and a second end;
   placing end caps onto said first and second ends of said filter element to fluidly seal said ends, such that said unfiltered fuel must pass through said filter element from one of said peripheries to said other periphery;
   securing said end caps together in fixed relation by a snap connection with said filter element compressed therebetween; and
   wherein said snap connection is comprised of a plurality of locking tabs extending from one of said end caps along said outside periphery of said filter element and into a plurality of mating locking clips disposed on an outer periphery of another one of said end caps.

5. A no-cure fuel filter for vehicles, comprising:

a non-organic mineral based filter element disposed within a path of flow of unfiltered fuel in a fuel system of a vehicle, said filter element having an exterior periphery and an interior periphery and a first end and a second end, said filter element being fiberglass bonded with a thermostat adhesive binder;

end caps disposed over and fluidly sealing said first and second ends of said filter element, such that said unfiltered fuel must pass through said filter element from one of said peripheries to said other periphery;

wherein the fiberglass has a nominal fiber diameter of between 0.00020 and 0.00024 inches, a density of 5.8 pounds per cubic foot and a phenolic binder of 10%±3% by weight; and wherein said fiberglass has a spiral interleaf of AA fibers between 0.75 and 1 microns, a density of 5.3 gm/sf, a phenolic binder content of 13.5% and a thickness of 0.25 inches.

* * * * *